(12) United States Patent
Bregman et al.

(10) Patent No.: US 12,260,204 B2
(45) Date of Patent: Mar. 25, 2025

(54) AUTOMATICALLY DEPLOYING A DEVELOPMENT ENVIRONMENT ON A TARGET SYSTEM

(71) Applicant: RED HAT, INC., Raleigh, NC (US)

(72) Inventors: Arie Bregman, Gan-Yavne (IL); David Sariel, Holon (IL)

(73) Assignee: Red Hat, Inc., Raleigh, NC (US)

( * ) Notice: Subject to any disclaimer, the term of this patent is extended or adjusted under 35 U.S.C. 154(b) by 189 days.

(21) Appl. No.: 17/888,688

(22) Filed: Aug. 16, 2022

(65) Prior Publication Data

US 2024/0061666 A1 Feb. 22, 2024

(51) Int. Cl.
G06F 8/61 (2018.01)
G06F 8/71 (2018.01)

(52) U.S. Cl.
CPC . *G06F 8/63* (2013.01); *G06F 8/71* (2013.01)

(58) Field of Classification Search
CPC .................................... G06F 8/63; G06F 8/71
USPC .......................................................... 717/177
See application file for complete search history.

(56) References Cited

U.S. PATENT DOCUMENTS

| | | | |
|---|---|---|---|
| 8,489,929 B2 | 7/2013 | Lam et al. | |
| 9,916,233 B1 * | 3/2018 | Qureshi | G06F 11/3688 |
| 10,042,661 B1 * | 8/2018 | Emelyanov | G06F 9/45545 |
| 10,114,627 B2 * | 10/2018 | Bergen | G06Q 30/016 |
| 10,459,823 B1 * | 10/2019 | Lieberman | G06F 11/362 |
| 10,467,121 B2 * | 11/2019 | Natari | G06F 11/3688 |
| 10,503,484 B2 * | 12/2019 | Zhang | G06F 8/34 |
| 10,572,226 B2 * | 2/2020 | Biskup | G06F 8/60 |
| 10,761,765 B2 * | 9/2020 | Duggal | G06F 3/0607 |
| 11,733,974 B2 * | 8/2023 | Orozco Cervantes | G06F 8/60 717/101 |
| 2010/0293144 A1 | 11/2010 | Bonnet | |
| 2016/0239296 A1 * | 8/2016 | Ahuja | G06F 8/33 |

(Continued)

FOREIGN PATENT DOCUMENTS

| CN | 106598681 A | 4/2017 |
|---|---|---|
| CN | 105824614 B | 5/2019 |

(Continued)

OTHER PUBLICATIONS

Savusalo, Tuomas. Application for managing container-based software development environments. MS thesis. T. Savusalo—University of Oulu, Faculty of Information Technology and Electrical Engineering—Apr. 2023.*

(Continued)

*Primary Examiner* — Francisco J Aponte
(74) *Attorney, Agent, or Firm* — Kilpatrick Townsend & Stockton LLP

(57) ABSTRACT

A deployment engine executing on a computing device can receive a command from a user via a command line interface of the deployment engine. The command can include a predesignated flag for replicating a software development environment that is local to the computing device. The deployment engine can obtain configuration data describing characteristics of the software development environment. The deployment engine can, in response to receiving the command, build an image file based on the configuration data. The image file can be configured for deploying the software development environment inside a virtual guest on a remote computing device.

19 Claims, 3 Drawing Sheets

(56) References Cited

U.S. PATENT DOCUMENTS

| | | | |
|---|---|---|---|
| 2018/0239802 A1* | 8/2018 | Fabijancic | G06F 11/3664 |
| 2018/0285139 A1* | 10/2018 | Shapira | G06F 9/45558 |
| 2019/0303187 A1* | 10/2019 | Vu | G06F 9/45558 |
| 2020/0117434 A1* | 4/2020 | Biskup | G06F 9/445 |
| 2021/0141645 A1* | 5/2021 | Kramer | G06F 8/63 |
| 2022/0012049 A1* | 1/2022 | Vincent | G06F 8/71 |
| 2022/0043641 A1* | 2/2022 | Nagar | H04L 63/08 |
| 2022/0197689 A1* | 6/2022 | Hotinger | G06F 9/45558 |
| 2022/0308861 A1* | 9/2022 | Frackiewicz | G06F 8/447 |
| 2023/0244467 A1* | 8/2023 | O'Connor | G06F 8/65 717/170 |
| 2023/0359457 A1* | 11/2023 | Van Der Hoorn | G06F 9/45558 |
| 2024/0078116 A1* | 3/2024 | Kramer | G06F 9/4401 |
| 2024/0095028 A1* | 3/2024 | McCarthy | G06F 8/71 |

FOREIGN PATENT DOCUMENTS

| | | | |
|---|---|---|---|
| CN | 112698919 A | | 4/2021 |
| CN | 111897551 B | | 7/2021 |
| CN | 114047937 A | * | 2/2022 |
| CN | 114594994 A | | 6/2022 |
| CN | 114756246 A | * | 7/2022 |

OTHER PUBLICATIONS

English Text Translation for Document No. CN-114047937-A.*
Savusalo T. (2023) Application for managing container-based software development environments. University of Oulu, Degree Program in Computer Science and Engineering. Master's Thesis. Apr. 2023.*
Ludwigson, Elli, "Docker containers vs VMs for quick consistent local dev," https://ddev.com/ddev-local/docker-containiners-vs-vms-for-quick-consistent-local-dev/, Jun. 12, 2018; pp. 1-11.

* cited by examiner

AUTOMATICALLY DEPLOYING A DEVELOPMENT ENVIRONMENT ON A TARGET SYSTEM

TECHNICAL FIELD

The present disclosure relates generally to distributed computing systems. More specifically, but not by way of limitation, this disclosure relates to automatically deploying a development environment on a target system.

BACKGROUND

A computing device can include a software development environment that can be used by a software developer to build or edit software systems. The software development environment can include software packages, source code editors, build automation tools, integrated development environments, or any other suitable items that can be used for building or editing software systems. The software development environment may also have environment variables associated therewith. In some cases, the software developer can use the software development environment to debug existing software. Commonly the software development environment is local to the software developer's own personal computer.

DETAILED DESCRIPTION

Figure 1:
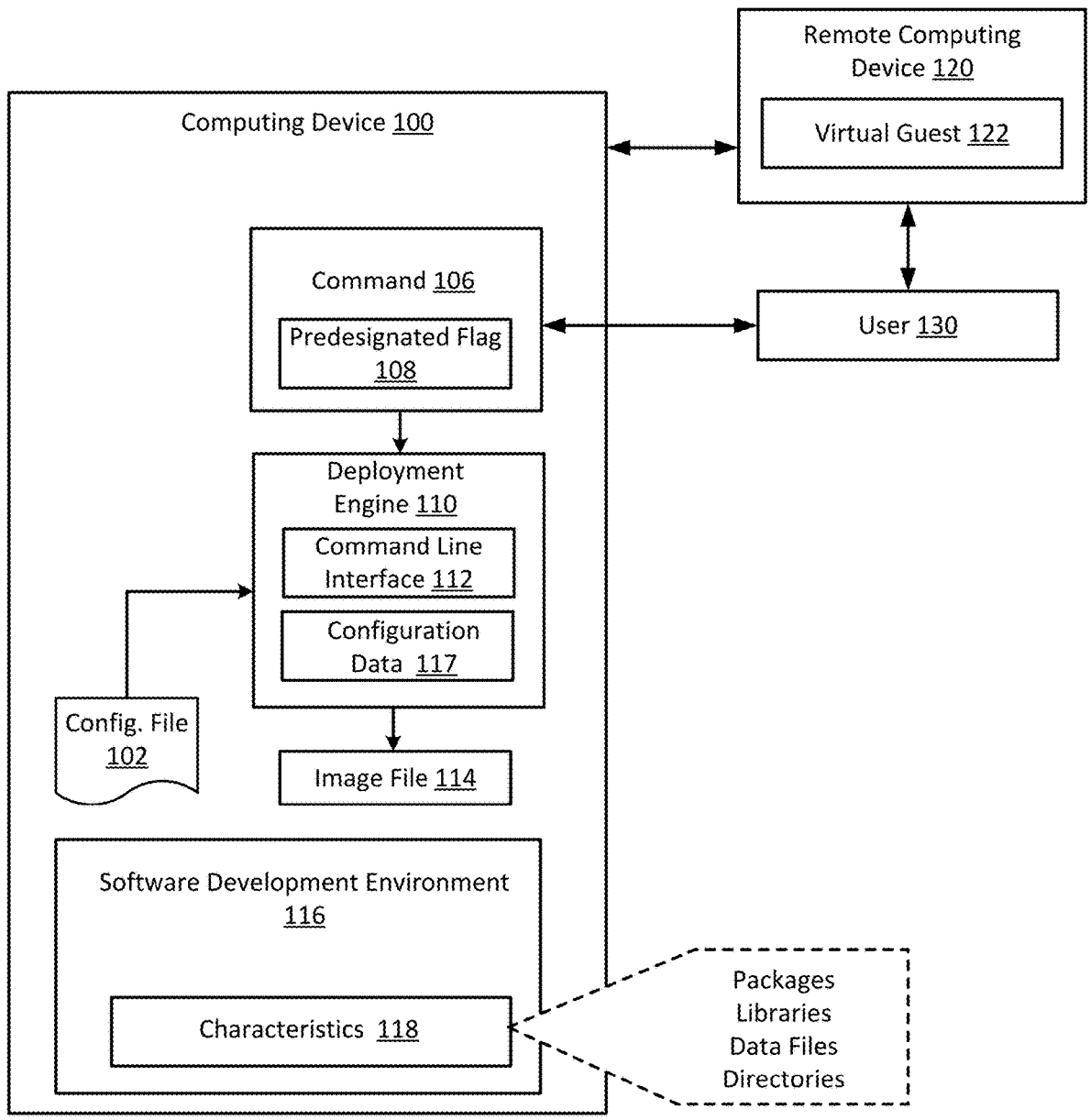
FIG. 1 is a block diagram of an example of a system for automatically deploying a development environment on a target system according to some aspects of the present disclosure.

A software developer may develop program code using a software development environment and then deploy the program code into a test environment for use in testing the program code. The test environment may include one or more virtual guests, such as virtual machines or containers, running on one or more host machines. In some circumstances, the test environment may be designed to mimic a production environment to help the software developer understand how their software might perform in production. Typically, the test environment is remote from the software developer's local machine and separate from the software development environment. For example, the software development environment may be local to the software developer's personal computer and the test environment may include one or more virtual machines running in a cloud computing environment. As a result, the test environment may lack certain characteristics or features that may be present in the software development environment, particularly if the software development environment is native or local to the software developer's personal computer. Such characteristics or features may be referred to herein as software development features. For example, the test environment may lack software packages, source code editors, build automation tools, integrated development environments, plugins, shortcuts, or other software development features that may be present in the software development environment. Differences between the test environment and a software development environment can make it difficult for a software developer to debug or develop their program code in the test environment. For example, the software developer may be familiar with an integrated development environment, editor, or build automation tool that may be present on the software developer's local machine but may not be present in the test environment.

Some examples of the present disclosure can overcome one or more of the abovementioned problems by providing a deployment engine that can automatically replicate aspects of a software development environment that is located on one computing device within a test environment that is located on another computing device. This can provide the test environment with software development features that are present in the software development environment. By using the deployment engine to automatically deploy aspects of the software development environment in the test environment, the software developer may be better equipped to perform debugging and development within the test environment. The automation can also expedite the setup process, so that the software developer does not need to manually set up and configure software development tools in the test environment.

In some examples, the deployment engine can include a container deployment engine, such as Docker, Podman, LXC, Containerd, or any other suitable container deployment engine. Additionally or alternatively, the deployment engine can include a virtual machine (VM) deployment engine such as a hypervisor. Examples of a hypervisor can include Oracle VM VirtualBox, VMware Server and Workstation, Microsoft Virtual PC, KVM, and QEMU. The deployment engine may be modified to include the functionality described herein, in addition to its usual functionality. For example, the deployment engine may include a command line interface for use in deploying a virtual guest on a remote computing device. The command line interface can be modified to accept a new argument (e.g., flag), where the argument can be issued by a user as part of a command to deploy a virtual guest on a remote machine. The virtual guest may be for testing purposes and correspond to a test environment. The argument can be for replicating one or more aspects of a software development environment inside the virtual guest, for example as part of the process for deploying the virtual guest on the remote machine. In response to receiving the argument, the deployment engine can facilitate a process for automatically deploying the virtual guest on the remote machine, such that the virtual guest is configured with one or more characteristics of the software development environment.

In some examples, the deployment engine can determine which features of the software development environment are to be replicated in the virtual guest based on configuration data. The configuration data can characterize aspects and features of the software development environment. For example, the configuration data can describe the software characteristics of the software development environment, such as its packages and libraries. The configuration data can also include settings for the packages and libraries. The configuration data may further include values of environment variables associated with the software development environment.

The development engine can obtain the configuration data in any suitable manner. For example, the deployment engine can read a predefined configuration file associated with the software development environment. The predefined configuration file may be drafted by the software developer or another user. As another example, the user can provide the configuration data to the deployment engine directly. Additionally or alternatively, the deployment engine can perform introspection operations to automatically analyze the characteristics of the software development environment and automatically determine the configuration data.

In some examples, the deployment engine can build an image file based on the configuration data. The deployment engine may automatically build the image file in response to receiving the command with the argument from the user. The image file can be configured for deploying some or all of the software development environment inside the virtual guest on the remote computing device. As noted above, the virtual guest can include a virtual machine or a container that is executable on the remote computing device. In some examples, the deployment engine can use the image file to deploy and configure the virtual guest on the remote computing device. For example, the deployment engine can use the image file to deploy and configure a container (e.g., a Docker container) on the remote computing device so that the container mimics aspects of the software development environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system with a deployment engine 110 for deploying a software development environment 116 on a target system according to some aspects of the present disclosure. In particular, the deployment engine 110 can be located on a computing device 100, such as a laptop computer, desktop computer, tablet, or mobile device. The computing device 100 may be a personal computer of a software developer, in some examples. The deployment engine 100 can receive a command 106 from a user and, in response, automatically replicate aspects of the software development environment 116 within a virtual guest 122 on a remote computing device 120.

More specifically, the deployment engine 110 can receive a command 106 from a user 130 via a command line interface 112 of the deployment engine 110. The command 106 can include a predesignated flag 108 or other argument for instructing the deployment engine 110 to replicate a software development environment 116 that may be local to the computing device 100. In response to receiving the command 106 with the predesignated flag 108, the deployment engine 110 can perform a replication process.

To help with the replication process, the deployment engine 110 can obtain configuration data 117 associated with the software development environment 116. For example, a user 120 can be prompted to provide the configuration data 117 to the deployment engine 110. In some examples, the user 130 can provide the configuration data 117 to the deployment engine 110 via the command line interface 112. In some examples, the deployment engine 110 can retrieve the configuration data 117 from a predefined configuration file 102. In some examples, the predefined configuration file 102 can be stored on the computing device 100 prior to receiving the command 106. In some examples, the deployment engine 110 may prompt the user 120 for the location of the predefined configuration file 102 via the command line interface 112. Additionally or alternatively, the deployment engine 110 can perform an introspection process on the computing device 100 to determine the configuration data 117. The introspection process can involve collecting data from the about a software configuration of the computing device 100.

The configuration data 117 can include characteristics 118 of the software development environment 116. For example, the characteristics 118 can include values for environment variables associated with the software development environment 116. Additionally or alternatively, the characteristics 118 can include information associated with software packages that are installed on the local version of the software development environment 116. In some examples, the characteristics 118 can include a computing architecture associated with the local version of the software development environment 116 on the computing device 100.

In response to receiving the command 106, the deployment engine 110 can build an image file 114 based on the configuration data 117. In some examples, building the image file 114 can involve incorporating a set of software components into the image file 114. For example, the deployment engine 110 can determine a set of software components to incorporate into the image file 114, and build the image file 114 by incorporating the software components into the image file 114. In some examples, the set of software components can include one or more packages, libraries, data files, directories, or any combination of these. The image file 114 can be configured for deploying the software development environment 116 inside a virtual guest 122 on the remote computing device 120. In some examples, the virtual guest 122 can include a container.

A container can be a relatively isolated virtual environment that can be created by leveraging the resource isolation features of a kernel. The container can be allotted computing resources for executing processes, such as running software programs. Deploying software programs inside containers can help isolate the software programs from one another and provide other benefits. A container can be deployed by a container engine from an image file 114, so in some cases the image file 114 may be referred to as a container image. A container image can be conceptualized as a stacked arrangement of layers in which a base layer is positioned at the bottom and other layers are positioned above the base layer. In some examples, the base layer may include operating system files for deploying a guest operating system inside the container. The guest operating system may be different from the underlying host operating system of the physical machine on which the container is deployed. The other layers may include other libraries, binaries, and configuration files. In some examples, the deployment engine 110 can build the image file 114 based on the configuration data 117 by incorporating one or more layers into the image file 114. The layers can include a set of software components and settings selected based on the configuration data 117.

Additionally or alternatively, the virtual guest 122 can include a virtual machine (VM). The virtual machine can be a virtual emulation of a computer system created using software on the remote computing device 120 in order to emulate the functionality of a separate physical computer. For example, the virtual machine can execute on an operating system, such as Red Hat Enterprise Linux (RHEL). The virtual machine can be allotted an amount of computing resources, such as processing power and memory, that the virtual machine can use to perform operations. The virtual machine can include an operating system that can execute computer programs and provide services for the computer programs. The virtual machine can be deployed by and managed by a hypervisor, or other similar software program. In some examples, the command-line interface 112 can include a tool for interfacing with the hypervisor. For example, the command-line interface 112 can include virsh for managing the hypervisor, managing the virtual machine, or managing both.

The image file 114 can be used to deploy the virtual guest 122 on the remote computing device 120. In some examples, the deployment engine 110 can cause the computing device 100 to transmit the image file 114 to the remote computing device 120. The remote computing device 120 can use the image file 114 to configure a container or virtual machine on the remote computing device 120 that has at least some of the characteristics of the software development environment 116. In some examples, the remote computing device 120 can use the image file 114 to replicate the software development environment 116 on the remote computing device 120. For example, the remote computing device 120 can use the image file 114 to generate a copy of the software development environment 116 on the remote computing device 120 with the software packages, environment variables, files, and other characteristics 118 that are present in the software development environment 116 that is local to the computing device 100.

In some examples, the computing device 100 can manage the deployment process. For example, the computing device 100 use the image file 114 to deploy the software development features within the virtual guest 122 on the remote computing device 120. This may involve transmitting one or more commands to the remote computing device 120 for controlling deployment of the software development features on the remote computing device 120.

Once the software development environment 116 has been replicated on the remote computing device 120, the software developer or another user 130 can access the software development features now present on the remote computing device 120. For example, the user 130 can access the virtual guest 122 over a network (e.g., the Internet) using a secure shell (SSH) connection or another mechanism. Once the user 130 has obtained access to the virtual guest 122, the user 130 can use any of the tools, packages, libraries, files, or other software development features that are now present in the virtual guest 122. The virtual guest 122 can be intended to be primarily used for testing purposes, but the ability to perform debugging and further development right inside the virtual guest 122 can be enhanced by the presence of the additional software development features. For example, a software developer can use testing software within the virtual guest 122 to test source code. If the testing software detects one or more errors in the source code, the software developer can then leverage the software development tools to assist with debugging.

Figure 2:
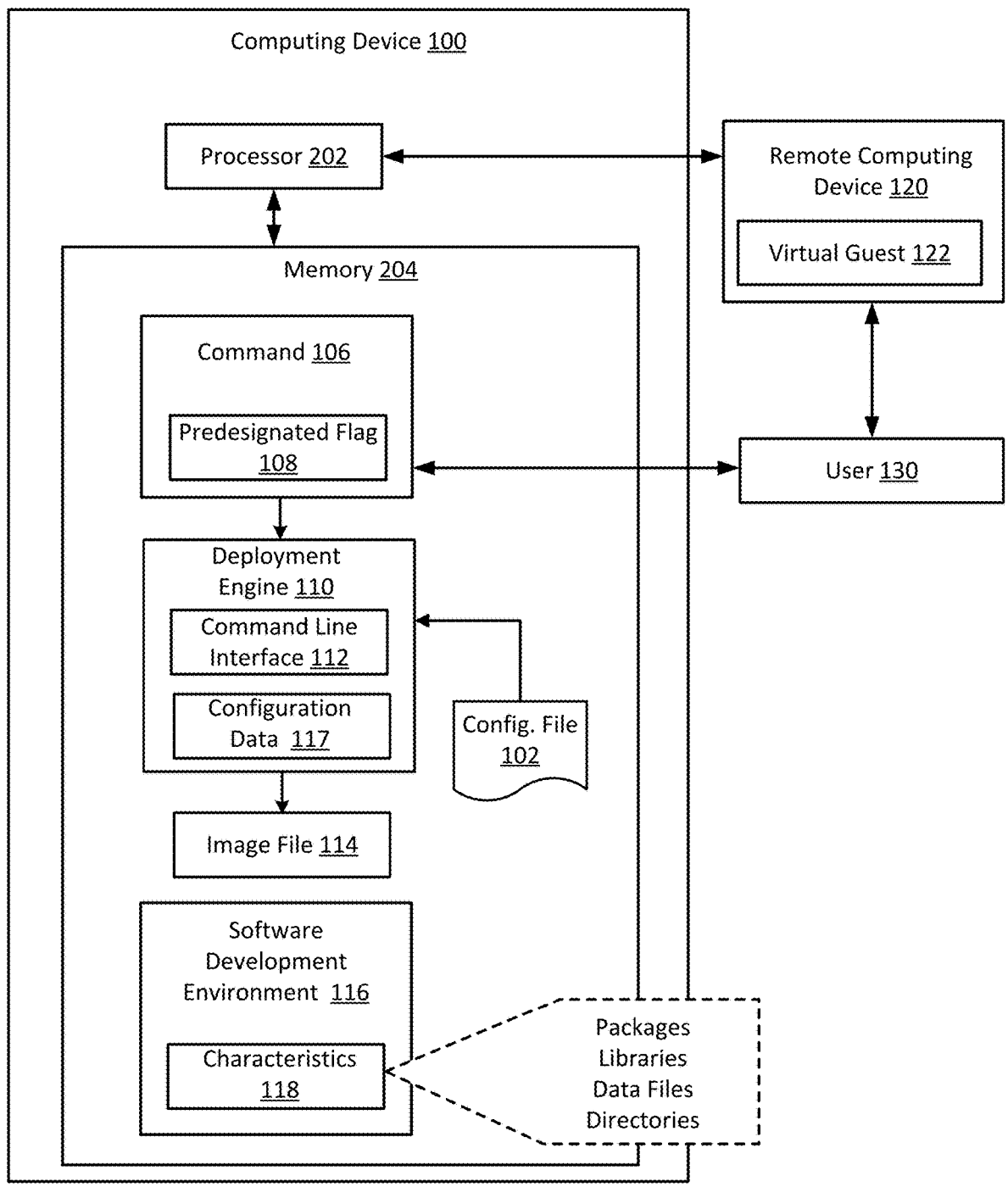
FIG. 2 is a block diagram of another example of a system for automatically deploying a development environment on a target system according to some aspects of the present disclosure.

FIG. 2 is a block diagram of another example of a system for deploying a software development environment 116 on a target system according to some aspects of the present disclosure. The system can include a processor 202 and a memory 204. The processor 202 and memory 204 can be integrated into a single housing or can be distributed from one another.

The processor 202 can include one processor or multiple processors. Non-limiting examples of the processor 202 include a Field-Programmable Gate Array (FPGA), an application-specific integrated circuit (ASIC), and a microprocessor. The processor 202 can execute instructions 206 stored in the memory 204 to perform one or more operations. In some examples, the instructions 206 can include processor-specific instructions generated by a compiler or an interpreter from code written in any suitable computer-programming language, such as C, C++, C #, and Java.

The memory 204 can include one memory device or multiple memory devices. The memory 204 can be volatile or non-volatile, in that the memory 204 can retain stored information when powered off. Non-limiting examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 202 with the instructions 206 or other program code. Non-limiting examples of a computer-readable medium include magnetic disks, memory chips, ROM, random-access memory (RAM), an ASIC, a configured processor, optical storage, or any other medium from which a computer processor can read the instructions 206.

In some examples, the memory 204 can include the deployment engine 110. The deployment engine 110 can include a command line interface 112. The deployment engine 110 can receive a command 106 via the command line interface 112. For example, a user 130 can input the command 106 to the command line interface 112. The command 106 can include a pre-designated flag 108 or other argument for replicating a software development environment 116 that is local to the computing device 100. In some examples, the deployment engine 110 can deploy the software development environment 116 inside a virtual guest 122 of the remote computing device 120 in response to receiving the command 106. For example, the deployment engine 110 can obtain configuration data 117 describing characteristics 118 of the software development environment 116. In response to receiving the command 106, the deployment engine 110 can build an image file 114 based on the configuration data 117. The image file 114 can be configured for deploying the software development environment 116 inside a virtual guest 122 on a remote computing device 120.

Figure 3:
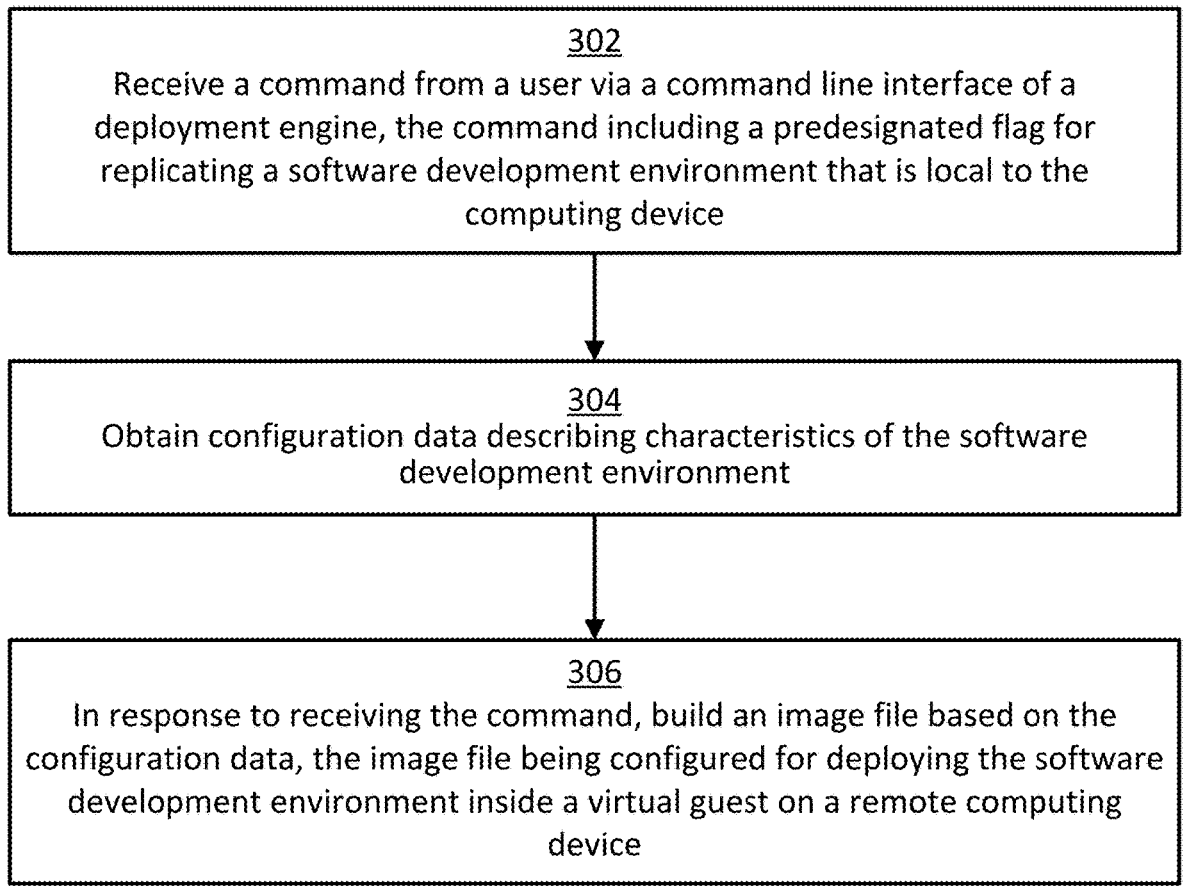
FIG. 3 is a flow chart of a process for automatically deploying a development environment on a target system according to some aspects of the present disclosure.

FIG. 3 is a flow chart of a process for deploying a software development environment 116 on a target system according to some aspects of the present disclosure. Other examples may include more steps, fewer steps, different steps, or a different order of steps than is shown in FIG. 3. The steps of FIG. 3 will be described below with reference to the components of FIG. 2 described above.

At block 302, a deployment engine 110 executing on a computing device can receive a command 106 from a user via a command line interface 112 of the deployment engine 110. The command 106 can include a predesignated flag 108 (e.g. '-r') or other argument for replicating a software development environment 116 that is local to the computing device 100. The predesignated flag 108 can be a modifier that can be appended to the command 106. For example, the predesignated flag 108 can be a character or series of characters. The predesignated flag 108 can modify the command 106 such that the command 106 causes the deployment engine 110 to replicate the software development environment 116.

For example, the deployment engine 110 can include internal program logic that can initiate a process for replicating the software development environment 116 in response to receiving the command 106 when the predesignated flag 108 or other argument is present. The predesignated flag 108 can be used in conjunction with other arguments or modifiers that can further configure the process of replicating the software development environment 116. For example, the predesignated flag 108 can be used in conjunction with a verbose flag for causing the command line interface 112 to display information that may be associated with the process of replicating the software development environment 116 while the software development environment 116 is being replicated.

At block 304, the deployment engine 110 obtains configuration data 117 describing characteristics 118 of the software development environment 116. For example, the configuration data 117 can be stored in a predefined configuration file 102. The predefined configuration file 102 can be generated prior to the execution of the command 106. In some examples, the predefined configuration file 102 can be a text file, or a file of any other suitable file format that is capable of containing structured data. In some examples, the predefined configuration file 102 can include a lightweight data interchange format, such as JSON. Additionally or alternatively, the predefined configuration file can include a data serialization language, such as YAML. In some examples, the configuration data 117 can include environment variables associated with the software development environment 116. For example, the configuration data 117 may include key-value pairs that can include the variables and their respective values. In some examples, the user 130 can be prompted to enter the configuration data 117 manually via the command line interface 112. Additionally or alternatively, the configuration data 117 can include information associated with software packages that are installed on the local software development environment 116 or any other suitable characteristics 118 that are associated with the local software development environment 116.

For example, the configuration data 117 can include a list of software packages that are installed on the local software development environment 116. The deployment engine 110 can use the list of software packages to instruct the remote computing device 120 to initiate a download or a series of downloads for receiving the software packages. Alternatively, the deployment engine 110 can cause the computing device 100 to transmit the software packages directly to the remote computing device 120. Once the remote computing device 120 has received the software packages, the remote computing device 120 can install the software packages. The characteristics 118 can also include hardware characteristics, operating system characteristics, a computing architecture, or other information associated with the software development environment 116.

At block 306, the deployment engine 110 builds an image file 114 based on the configuration data 117, in response to receiving the command. The image file 114 can be configured for deploying the software development environment 116 inside a virtual guest on a remote computing device 120. For example, the computing device 120 can incorporate a software package or a series of software packages into the image file 114 in order to build the image file 114. Building the image file 114 can involve incorporating the contents of one or more software packages into a tarball or any other suitable file format that can incorporate a collection of several files into one file. Once the image file 114 has been built, the computing device 100 can transmit the image file 114 to the remote computing device 120. Prior to transmitting the image file 114, the computing device can compress the contents of the image file 114 to decrease a file size associated with the image file. For example, the image file 114 can be contained within a zip file or other suitable compressed data format. The remote computing device 120 can include programs or software for decompressing the image file 114 once it has been received.

The remote computing device 120 can deploy the software development environment 116 on the virtual guest 122 of the remote computing device 120 based on the contents of the image file 114. For example, the software development environment 116 can include software packages, programs, environment variables, text editors, or any other suitable features or characteristics 118 that are specified in the image file 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code for a deployment engine that is executable by a processor of a computing device to:
receive a command from a user via a command line interface of the deployment engine, the command including a predesignated flag for replicating a software development environment that is local to the computing device;
obtain configuration data describing characteristics of the software development environment;
in response to receiving the command, build an image file based on the configuration data, the image file being configured for deploying the software development environment; and
transmit the image file to a test environment, the test environment being configured to receive the image file and responsively deploy the software development environment using the image file, wherein the test environment is configured to deploy the software development environment inside a container or a virtual machine.

2. The non-transitory computer-readable medium of claim 1, wherein the deployment engine is further executable by the processor to obtain the configuration data from a predefined configuration file, the predefined configuration file specifying software characteristics of the software development environment, the predefined configuration file being stored on the computing device prior to receiving the command.

3. The non-transitory computer-readable medium of claim 1, wherein the deployment engine is further executable by the processor to obtain the configuration data by performing an introspection process on the computing device, the introspection process involving collecting information about a software configuration of the computing device.

4. The non-transitory computer-readable medium of claim 1, wherein the deployment engine is further executable by the processor to:
determine a set of software components to incorporate into the image file based on the characteristics of the software development environment; and
build the image file by incorporating the set of software components into the image file.

5. The non-transitory computer-readable medium of claim 4, wherein the set of software components includes a package, a library, a data file, and a directory.

6. The non-transitory computer-readable medium of claim 1, wherein the predesignated flag corresponds to logic integrated into the deployment engine, the deployment engine being configured to execute the logic in response to receiving the command with the flag, the logic being configured to cause the deployment engine to build the image file based on the configuration data.

7. The non-transitory computer-readable medium of claim 1, wherein the deployment engine is a container deployment engine or a virtual machine deployment engine.

8. A method comprising:
receiving, by a deployment engine executing on a computing device, a command from a user via a command line interface of the deployment engine, the command including a predesignated flag for replicating a software development environment that is local to the computing device;
obtaining, by the deployment engine, configuration data describing characteristics of the software development environment;
in response to receiving the command, building, by the deployment engine, an image file based on the configuration data, the image file being configured for deploying the software development environment; and
transmitting, by the computing device, the image file to a test environment, wherein the test environment receives the image file and responsively deploys the software development environment using the image file, wherein the test environment deploys the software development environment inside a container or a virtual machine.

9. The method of claim 8, further comprising:
obtaining, by the deployment engine, the configuration data from a predefined configuration file, the predefined configuration file specifying software characteristics of the software development environment, the predefined configuration file being stored on the computing device prior to receiving the command.

10. The method of claim 8, further comprising:
obtaining, by the deployment engine, the configuration data by performing an introspection process on the computing device, the introspection process involving collecting information about a software configuration of the computing device.

11. The method of claim 8, further comprising:
determining a set of software components to incorporate into the image file based on the characteristics of the software development environment; and
building the image file by incorporating the set of software components into the image file.

12. The method of claim 8, wherein the predesignated flag corresponds to logic integrated into the deployment engine, the deployment engine being configured to execute the logic in response to receiving the command with the flag, the logic being configured to cause the deployment engine to build the image file based on the configuration data.

13. The method of claim 8, wherein the deployment engine is a container deployment engine or a virtual machine deployment engine.

14. A computing device comprising:
a software development environment;
a processor; and
a memory including instructions for a deployment engine that is executable by the processor to:
obtain configured data describing characteristics of the software development environment by performing an introspection process on the computing device, the introspection process involving collecting information about a software configuration of the computing device;
receive a command from a user via a command line interface of the deployment engine, the command including a predesignated flag for replicating the software development environment that is local to the computing device, the predesignated flag corresponding to logic integrated into the deployment engine, the deployment engine being configured to execute the logic in response to receiving the command with the flag, the logic being configured to cause the deployment engine to build an image file based on the configuration data describing the characteristics of the software development environment; and
in response to receiving the command, execute, by the deployment engine, the logic to build the image file based on the configuration data, the image file being configured for deploying the software development environment inside a virtual guest on a remote computing device.

15. The computing device of claim 14, wherein the deployment engine is further executable by the processor to obtain the configuration data from a predefined configuration file, the predefined configuration file specifying software characteristics of the software development environment, the predefined configuration file being stored on the computing device prior to receiving the command.

16. The computing device of claim 14, wherein the deployment engine is further executable by the processor to:
determine a set of software components to incorporate into the image file based on the characteristics of the software development environment; and
build the image file by incorporating the set of software components into the image file.

17. The computing device of claim 16, wherein the set of software components includes a package and a library.

18. The computing device of claim 14, wherein the remote computing device corresponds to a test environment, and wherein the instructions are further executable by the processor to transmit the image file to the test environment, the test environment being configured to receive the image file and responsively deploy the software development environment inside the virtual guest on the remote computing device using the image file.

19. The computing device of claim 14, wherein the deployment engine is a container deployment engine or a virtual machine deployment engine.

* * * * *